United States Patent [19]

Claire et al.

[11] 4,083,354
[45] Apr. 11, 1978

[54] BARBECUE

[75] Inventors: Jean Henri Claire, Veules les Roses; Jean-Claude Henri Claire, St. Valery en Caux, both of France

[73] Assignee: Bernard Mercier, Ville d'Avray, France

[21] Appl. No.: 671,969

[22] Filed: Mar. 30, 1976

[30] Foreign Application Priority Data

Apr. 16, 1975 France .................. 75 12720
Mar. 25, 1976 France .................. 76 08634

[51] Int. Cl.² ........................ A47J 37/07
[52] U.S. Cl. .................. 126/30; 99/443 R; 99/450; 126/25 A; 248/124
[58] Field of Search .......... 126/30, 137, 25 R, 25 A, 126/9 R; 248/124, 125, 287, 295; 99/402, 443, 450

[56] References Cited

U.S. PATENT DOCUMENTS

| 758,015 | 4/1904 | Miller | 126/30 X |
|---|---|---|---|
| 2,519,612 | 8/1950 | Tuttle | 126/30 X |
| 2,522,223 | 9/1950 | Hardin et al. | 126/30 X |
| 2,698,726 | 1/1955 | Horve | 126/30 X |
| 3,162,113 | 12/1964 | Tallaksen | 126/30 X |
| 3,785,360 | 1/1974 | Martin | 126/9 R X |

FOREIGN PATENT DOCUMENTS 564,337 7/1975 Switzerland .................. 99/450

Primary Examiner—William F. O'Dea
Assistant Examiner—Harold Joyce
Attorney, Agent, or Firm—Arthur B. Colvin

[57] ABSTRACT

The invention relates to portable barbecue apparatus of the kind in which the grill member is adjustable in height with respect to the hearth in order to regulate the cooking heat intensity, and has for its object a barbecue of simple, robust construction providing a double adjustment of the grill, in height and transversely, with respect to the hearth. The apparatus comprises essentially a stand member and a grill and a two-way adjustable slide coupling means for positioning the grill with respect to the hearth in two component directions, the coupling comprising two pairs of retaining jaws cooperating respectively with the stand and the grill, each pair of jaws corresponding to one of the component directions.

Further features of the barbecue are that it can be used with a fireplace or a wood fire, and it is possible to carry the grill with the cooked food in one hand to serve at table. The construction is such that the assembly of the grill and coupling means can be rapidly removed from and replaced on the stand at will.

5 Claims, 8 Drawing Figures

U.S. Patent   April 11, 1978   Sheet 1 of 2   4,083,354
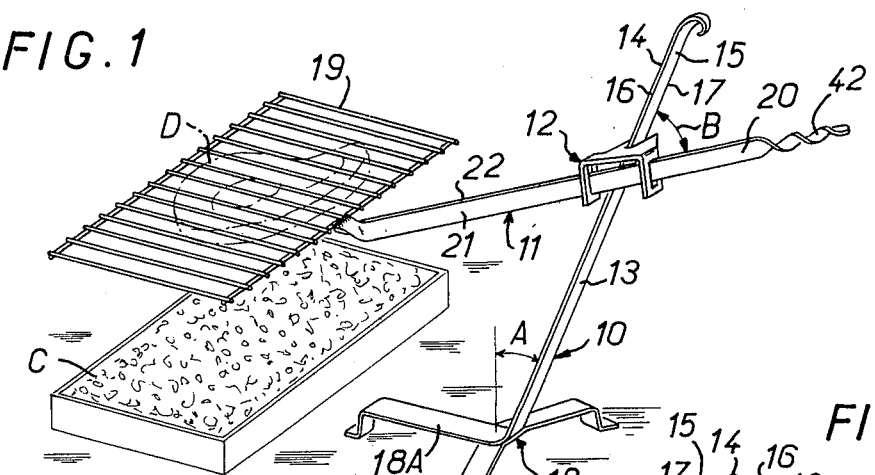
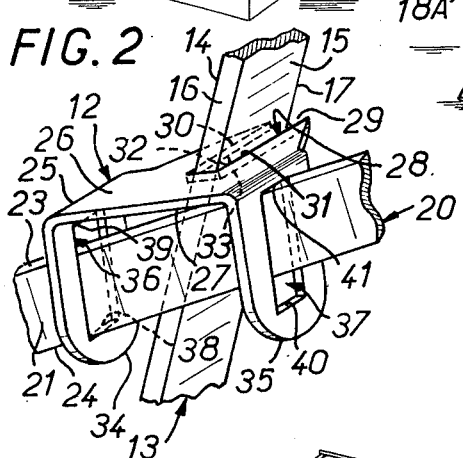
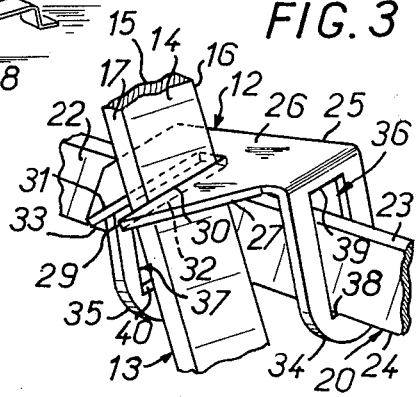
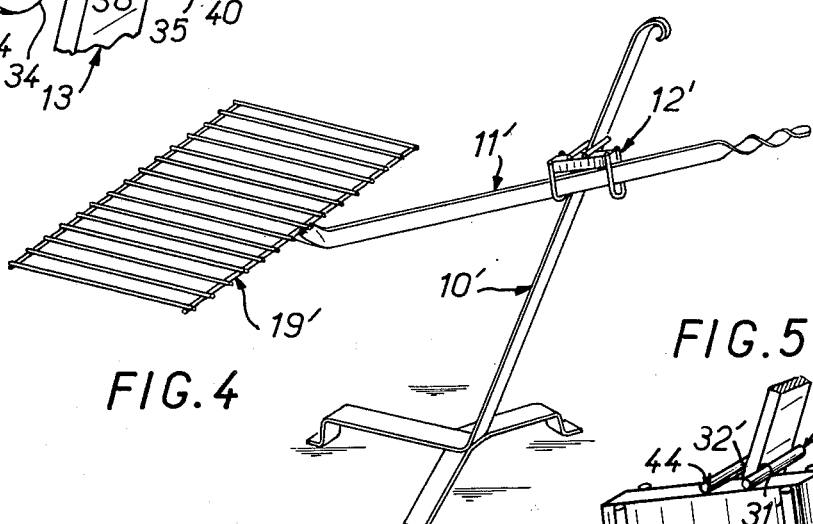
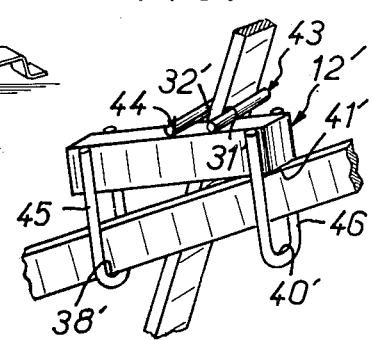

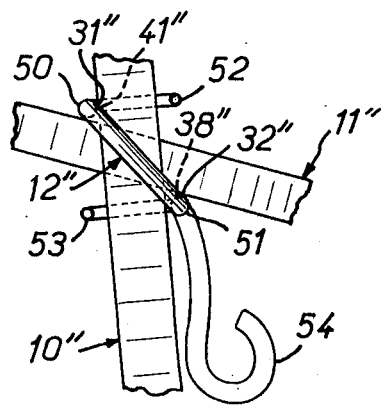
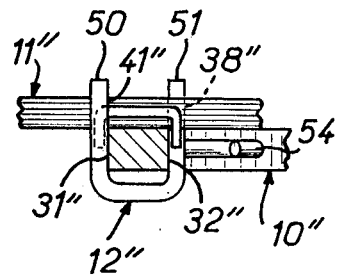
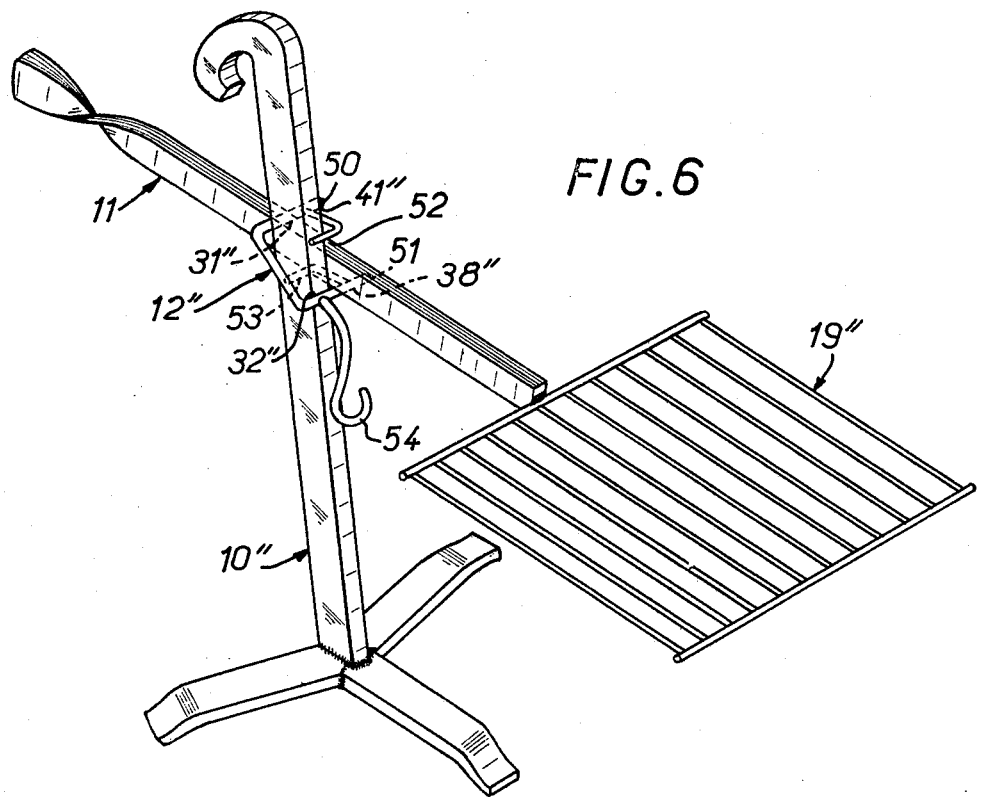

BARBECUE

In barbecues, the grill is generally displaceable solely in height with respect to the hearth, in order to provide a regulation for the intensity of the cooking heat. The constructions proposed for an adjustable grill of this kind are frequently comlicated by the use of screw systems.

In addition, known barbecues have the disadvantage that they cannot be used with hearths other than those for which they have been designed. In particular, they cannot be used either in a chimney or with a wood fire.

Furthermore, with known barbecues, it is generally not possible to carry the grill with a single hand up to the table in order to serve the grilled food.

The present invention has for its object a barbecue of simple and robust construction which readily permits a double adjustment, with very easy handling and universal conditions of utilization. A barbecue forming the subject of the present invention is especially characterized in that it comprises a stand member and a grill member and two-way adjustable slide-coupling means for coupling the grill member to the stand member for the purpose of positioning this grill member with respect to the stand member in two component directions, the said adjustable slide-coupling means comprising a first pair of gripping jaws co0operating with the stand member and a second pair of gripping jaws co-operating with the grill member, each of the said pairs of gripping jaws corresponding to one of the said component directions.

By virtue of this arrangement, it is possible to regulate the position of the grill with respect to the hearth, not only in height but also in plan. The double adjustment is very important for the optimum cooking position, given that it acts both on the radiation intensity and on its localization.

It is preferably on the grill member that the coupling means are permanently mounted, and it is the assembly formed by the grill member and these coupling means which can be removed from the stand member when it is desired to remove the grill from the hearth. In this way, it is easy to put the assembly back immediately into the working position.

The present invention will be more fully described by way of example with reference to the accompanying drawings, in which:

FIG. 1 is a general view of a grill device according to the invention;

FIG. 2 is a view to a larger scale of the coupling member, and shows more particularly the conditions under which the grill member is retained on the coupling member;

FIG. 3 is a view similar to FIG. 2, but shows the coupling member as seen from another angle, so as to show clearly the manner in which this coupling member is retained on the stand member;

FIG. 4 is a view similar to FIG. 1, but relates to an alternative form of construction;

FIG. 5 is a view to a larger scale of the coupling member of this alternative form;

FIG. 6 is also a view similar to FIG. 1 but is concerned with another alternative form;

FIG. 7 is a side view of the coupling member of this other alternative form;

FIG. 8 is a corresponding view looking from above, with parts shown in section.

In the form of construction shown in FIGS. 1 to 3, an adjustable grill device for an open hearth or barbecue according to the invention, is composed of a stand member 10, a grill member 11 and a coupling member 12 ensuring the mounting of the member 11 on the member 10 with a double adjustment along two component directions which correspond respectively to the central line axes of the members 10 and 11.

More particularly, the stand member 10 comprises a flat rising bar 13, slightly inclined to the vertical, for example making with the vertical an angle A of the order of 20° to 30°. The flat bar 13 is orientated in such manner that its front and rear faces 14 and 15 are faces of greater width extending along the line of greatest slope of the bar 13, while its two opposite edges 16 and 17 of smaller thickness extend in two vertical parallel planes separated by the width of the faces 14 and 15 of the bar 13.

At its lower extremity, the bar 13 is fixed on a tripod 18 which enables the stand member 10 to stand-up alone, especially when the grill member 11 is mounted on it. To this end, the tripod 18 has a leg 18A which extends generally from the same side as the grill 19 of the grill-carrier member 11 when this latter is mounted on the stand member 10. More particularly, the bar 13 is the continuation of the leg 18A of the tripod 18.

In order to carry the grill 19, the member 11 is provided with a flat transverse bar 20, similar to the flat bar 13 but lighter than this latter and directed perpendicularly wth respect thereto, that is to say with its two opposite faces of greater width, right-hand 21 and left-hand 22 arranged in two vertical planes separated by the thickness of the bar 20, while the two opposite edges corresponding to this thickness, respectively top 23 and bottom 24, extend along the line of greatest slope of the bar 20.

When the grill-carrier member 11 is mounted on the stand member 10 by means of the coupling member 12, the bar 11 is more inclined to the vertical than the bar 13, or if so preferred, closer to the horizontal than this latter. The bar 20 forms with the bar 13 an angle B which is for example between 40° and 50° as an indication.

The coupling member 12 is constituted by a plate 25 constituted by a folded sheet of metal of small thickness, for example of the same order of magnitude as the thickness of the edges 16 and 17 of the bar 13 or the thickness of the edges 23 and 24 of the bar 20.

The upper face and the lower face of the plate 25 are shown respectively at 26 and 27.

The plate 25 comprises a slot 28 which is open at its extremity at 29. The slot 28 defines with the upper face 26 of the plate 25 an upper front edge 30 and an upper rear edge 31 respectively, and the slot 28 defines with the lower face 27 of the plate 25 a front lower edge 32 and a rear lower edge 33.

The face defined between the front edges 30 and 32 and the face defined between the rear edges 31 and 33 are opposite to each other in order to define the slot 28, and are spaced apart from each other by a distance which is slightly greater than the thickness of the edges 16 and 17 of the bar 13.

The plate 25 also comprises two ears, a front ear 34 and a rear ear 35, each having a vertically elongated opening 36 and 37 respectively.

There can be seen at 38 and 39 the lower extremity and the upper extremity respectively of the opening 36, and at 40 and 41 the lower extremity and the upper extremity of the opening 37.

In the openings 36 and 37 the bar 20 is intended to be engaged, and for that purpose the distance comprised between the extremities 38 and 39 or between the extremities 40 and 41 is made slightly greater than the width of the large faces 21 and 22 of the bar 20.

In the form of embodiment shown in FIGS. 1 to 3, the coupling member 12 is slidably mounted along the bar 20, and is held imprisoned on this bar by being normally prevented from leaving it either on the side of the grill 19 because of the presence of this grill, or at the other extremity by a twisted portion 42 forming an operating handle.

The system thus constituted by the grill-carrier member 11 and the coupling member 12 is mounted at will on the bar 13 of the stand member 10 through the intermediary of the slot 28 in this coupling member 12.

Thus, the assembly holds by itself by the double effect of retaining jaws. In the first place, a retention effect of the bar 20 in the openings 36 and 37 of the ears 34 and 35. The upper edge 23 of the bar 20 abuts against the upper extremity 41 of the opening 37 of the rear ear 35, while the lower edge 24 of the bar 20 abuts against the lower extremity 38 of the opening 36 of the front ear 34, these edges 38 and 41 forming a pair of retaining jaws.

The inclination of the bar 20 is sufficiently small with respect to the horizontal, that is to say 90° less the sum of the angles A and B, or about 20°, and this small angle to the horizontal makes it possible to avoid the risk of accidental sliding movements, which could take place if the bar 20 were closer to the vertical.

With regard to the coupling member 12, its slot 28 engaged on the bar 13 ensures particularly effective retention by applying the front lower edge 32 of the slot 28 against the large front face 14 of the bar 13, and by the application of the rear upper edge 31 of the slot 28 against the large rear face 15 of the bar 13, the edges 31 and 32 forming a pair of retaining jaws.

The coupling means 12 thus comprise a first pair of retaining jaws 31, 32 and a second pair of retaining jaws 38, 41.

Although the rod 13 is only slightly inclined to the vertical, namely by the small angle which is of the order of 20° to 30°, there is no risk of accidental sliding of the member 12 along the bar 13 because the weight of the grill 19 which overhangs towards the front introduces a couple on the bar 13 from which it results that the edges 32 and 31 tend to be forced strongly against the wide faces 14 and 15, thus ensuring an effective locking action.

It will be noted that one of the sides of the bar 13 is normally in contact and at right angles with one of the sides of the bar 20, which increases the stability of the grill 19.

For the purpose of utilizing the device which has just been described, the grill-carrier member 11 provided with the sliding member 12 is first of all removed from the stand member 10. The fire is prepared in a hearth C and the and the food D to be grilled is arranged on the grill 19, having previously prepared it, for example by adding pepper, etc., while the fire is being drawn-up.

When the fire C is ready for cooking, the grill-carrier member 11 is moved forward while holding it by the extremity 42 serving as a handle, and engaging by the side the open extremity 29 of the slot 28 on the bar 13 (FIG. 2), after which the handle 42 is released. By so doing, the unit becomes automatically locked by the two-way retention at the level of the first pair of jaws 38 and 41 on the bar 20 and at the level of the second pair of jaws 31 and 32 on the bar 13 (see FIG. 3).

The way in which the food D carried by the grill 19 is located with respect to the hearth C is then examined, both from the point of view of its distance from and its location with respect to the hottest of the live embers.

It should be observed that the cooking of food on the barbecue makes it possible, depending on the way in which it is carried out, to obtain a very great culinary success or, on the contrary, to achieve an average or even poor result. It is in fact necessary that the food should remain perfectly tender inside without excess cooking, but hot and also the surface of the food must be covered with a thick, perfectly browned and crisp crust, but without any pale zone or any burnt zone.

It is therefore essential to observe scrupulously the conditions of the cooking, both as regards the position of the grill 19 in height with respect to the hearth C and in plan with respect to the hearth, given that the hearth C will inevitably have more or less incandescent embers, depending on the place where they are located, this place furthermore changing its position during the course of the cooking.

For example, if at the beginning of the cooking period it is especially the left-hand portion of the hearth which is the most incandescent, at the end of a short time this same portion will become less hot and be reduced to ashes, while it will be the right-hand portion which will become the hotter in its turn.

The apparatus according to the invention makes it possible to satisfy, in a simple and convenient manner, the best conditions which may be desired for perfect culinary success.

In fact, the person who is in charge of cooking can raise or lower the grill 19 with respect to the hearth in an extremely easy manner, since it is only necessary for that person to apply a slight pressure with the hand on the handle 42 so as to render the slot 28 easily slidable along the bar 13 and thus to raise or lower the grill, but at the same time, by virtue of an easy dexterity, the user can withdraw or move forward the grill 19 with respect to the hearth, and thus obtain at each adjustment the optimum position with respect to the fire.

It will be clear that the two adjustments permit an infinite number of positions to be obtained in each case. These positions are obtained by creating a counter couple which overcomes the retaining couple due to the gravity of the unit.

It will be appreciated that the construction of the apparatus which has just been described in particularly robust and inexpensive, and that this apparatus makes it possible, even for amateur cooks, to obtain results of a professional level.

The apparatus can be utilized not only with a hearth C provided for that purpose, but also in a fireplace or chimney or with a wood-fire, and more generally under any desired conditions. It will furthermore be appreciated that the grill 19 can be carried by hand with the food D, up to the table.

In the alternative shown in FIGS. 4 and 5, the arrangement is similar to that which has been described with reference to FIGS. 1 to 3 and similar parts have been given the same reference numbers followed by a prime index. The coupling member 12' is of welded construction. The first pair of jaws 31', 32' is defined by the fingers 43 and 44, while the second pair of jaws 38'.

41' is defined by hoops 45 and 46 bent to the shape of a hairpin.

In another alternative form shown in FIGS. 6 to 8, the arrangement is again similar to that which has been described with reference to FIGS. 1 to 3, and the same elements have been given the same reference numbers but followed by a second index, but in this case the grill member 11" is provided so as to be laterally separable from the coupling member 12", which is provided for mounting permanently on the stand member 10".

The coupling member 12" has the general shape of a fork with two arms 50 and 51, an upper rear arm 50 and a lower front arm 51, between which are engaged side by side the stand member 10" and the grill member 11". These arms 50 and 51 thus constitute over a part of their length the first pair of retaining jaws 31", 32", and over another portion of their length the second pair of retaining jaws 38", 41". The arms 50 and 51 carry respectively two elbowed fingers 52 and 53 which have no active function in the retention of the assembly, but they prevent the separation of the member 12" from the stand member.

The member 12" also carries a hook 54 intended to receive a weight so as to accentuate the locking effect, should this prove necessary.

What we claim is:

1. A barbecue comprising a stand member having a generally upright bar, a grill member having a cross bar, and a two-way adjustable slide-coupling means for coupling said grill member to said stand member and also for positioning said grill member with respect to said stand member in two component directions, said adjustable slide-coupling means including a first pair of retaining jaws adpated to cooperate with said stand member and a second pair of retaining jaws cooperating with said grill member, each of said pairs of retaining jaws corresponding to one of said component directions, said bars being rectangular in cross section, said first pair of retaining jaws being adapted to grip the large sides of said upright bar, and being opened at one end whereby the grill member can be easily removed while said second pair of retaining jaws grips the short sides of said cross-bar.

2. A barbecue as claimed in claim 1, in which one of the sides of said upright bar is normally in contact with and at right angles to one of the sides of said cross-bar.

3. A barbecue as claimed in claim 1, in which said cross-bar is adapted to release said first pair of retaining jaws by pivoting in a first direction against the force of gravity acting on said grill member, and permits repositioning of said grill member in said second component direction by a movement of simple translation.

4. A barbecue comprising a stand member having a generally upright bar, a grill member having a cross bar, and a two-way adjustable slide-coupling means for coupling said grill member to said stand member and also for positioning said grill member with respect to said stand member in two component directions, said adjustable slide-coupling means including a first pair of retaining jaws adapted to cooperate with said stand member and a second pair of retaining jaws cooperating with said grill member, each of said pairs of retaining jaws corresponding to one of said component directions, said first pair of retaining jaws being opened at one end whereby the grill member can be easily removed.

5. A barbecue comprising a stand member having a generally upright bar, a grill member having a cross bar, and a two-way adjustable slide coupling means having a central portion and two parallel depending lugs, said central portion having a first slot defining a first pair of opposed jaws normally in engagement with opposite surfaces of said upright bar, said first pair of jaws being opened at one end whereby the grill member can be easily removed, each of said lugs having a second slot closed at both ends for receiving said cross-bar, one end of a second slot of one lug and an opposite end of a second slot of the other lug defining a second pair of opposed jaws normally in engagement with opposite surfaces of said cross bar, said coupling means being retained on said cross bar even when said grill member is removed from said stand member.

* * * * *